United States Patent [19]

Yamamoto

[11] Patent Number: 5,304,606

[45] Date of Patent: Apr. 19, 1994

[54] THERMOPLASTIC RESIN COMPOSITION

[75] Inventor: Yohzoh Yamamoto, Yamaguchi, Japan

[73] Assignee: Mitsui Petrochemical Industries, Ltd., Tokyo, Japan

[21] Appl. No.: 31,491

[22] Filed: Mar. 15, 1993

Related U.S. Application Data

[62] Division of Ser. No. 821,053, Jan. 16, 1992, Pat. No. 5,262,485.

[30] Foreign Application Priority Data

Jan. 16, 1991 [JP] Japan ................... 3-3178
Dec. 17, 1991 [JP] Japan ................. 3-333721

[51] Int. Cl.$^5$ .............................. C08L 33/06
[52] U.S. Cl. ................... 525/210; 525/75; 525/93; 525/211; 525/193; 524/518
[58] Field of Search ............. 525/210, 75, 93

[56] References Cited

U.S. PATENT DOCUMENTS

| | | | |
|---|---|---|---|
| 3,297,794 | 1/1967 | Imai et al. | 260/885 |
| 3,485,775 | 12/1969 | Cenci et al. | 260/889 |
| 3,536,788 | 10/1970 | Hurwitz et al. | 525/210 |
| 4,045,517 | 8/1977 | Guerin et al. | 525/203 |
| 4,152,189 | 5/1979 | Guerin et al. | 428/522 |
| 4,591,626 | 5/1986 | Kawai et al. | 526/282 |
| 4,614,777 | 9/1986 | Kania | 526/279 |
| 4,849,479 | 7/1989 | Siol et al. | 525/216 |
| 4,868,261 | 9/1989 | Kobayashi et al. | 526/262 |
| 5,091,477 | 2/1992 | Bueschl et al. | 525/152 |

FOREIGN PATENT DOCUMENTS

| | | |
|---|---|---|
| 0264645 | 4/1988 | European Pat. Off. . |
| 0451809 | 10/1991 | European Pat. Off. . |
| 1569075 | 4/1970 | Fed. Rep. of Germany . |
| 1568560 | 3/1969 | France . |
| 2332300 | 6/1977 | France . |
| 63-089556 | 4/1988 | Japan . |

OTHER PUBLICATIONS

Database WPIL, No. 88-327836, Derwent Publication Ltd., London, GB; JP-A-63-243,108 (Japan Synthetic Rubber) Oct. 11, 1988.

Primary Examiner—Carman J. Seccuro, Jr.
Attorney, Agent, or Firm—Sherman and Shalloway

[57] ABSTRACT

A thermoplastic resin composition according to the present invention comprises a polymer comprising recurring units derived from a polycyclic (meth)acrylate represented by the following formula [I] and a soft polymer in the proportion by weight of the polymer to the soft polymer of 99:1 to 40:60

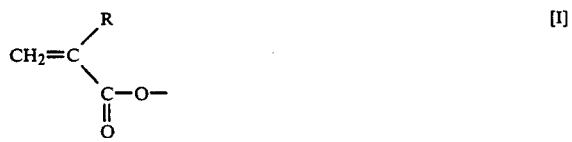

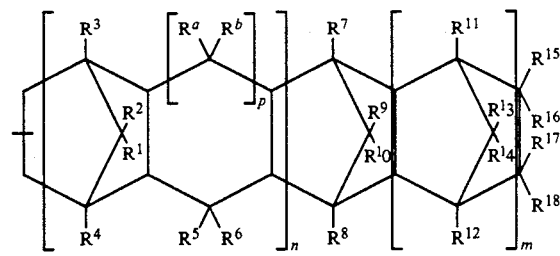

where m is 0 or a positive integer, n is 0 or 1, R is hydrogen or methyl, $R^1$-$R^{18}$ are each independently an atom or a group selected from the group consisting of hydrogen, halogen and hydrocarbon groups, $R^{15}$-$R^{18}$, linked together, may form a monocyclic or polycyclic group which may have a double bond, or an alkylidene group, p is 0 or 1, and $R^a$ and $R^b$ each independently represent a hydrogen atom or a hydrocarbon group when p is 1.

13 Claims, No Drawings

THERMOPLASTIC RESIN COMPOSITION

This is a division of application Ser. No. 07/821,053 filed Jan. 16, 1992, now U.S. Pat. No. 5,262,485.

FIELD OF THE INVENTION

The present invention relates to a novel thermoplastic resin composition, and more in detail to a thermoplastic resin composition comprising a polymer comprising recurring units derived from a polycyclic (meth)acrylate and a soft polymer.

BACKGROUND OF THE INVENTION

Amorphous resins such as polyester resins, ABS resins and modified PPO resins are excellent in characteristics such as rigidity, dimension accuracy and heat resistance, and accordingly have heretofore been widely used for automobile parts, electrical appliances, office automation instruments, miscellaneous goods, etc.

However, thermoplastic resins used for products as mentioned above have recently been increasingly employed under severe conditions such as at high temperature. The sever quality is required for the thermoplastic resins used under such severe conditions depending upon the conditions of use. Few of the conventionally used amorphous resins as described above satisfy such requirements, and therefore the realization of thermoplastic resins having still higher quality has been desired.

OBJECT OF THE INVENTION

The present invention has been accomplished in view of the prior art techniques as described above, and an object or the invention is to provide a thermoplastic resin composition excellent in characteristics such as heat resistance, rigidity, dimension accuracy, impact resistance and light resistance.

SUMMARY OF THE INVENTION

A thermoplastic resin composition according to the present invention comprises a polymer comprising recurring units derived from a polycyclic (meth)acrylate represented by the following formula [I] and a soft polymer in the proportion by weight of the polymer to the soft polymer of 99:1 to 40:60

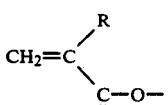

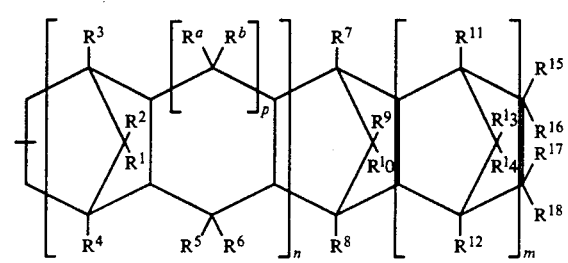

wherein m is 0 or a positive integer, n is 0 or 1, R is hydrogen or methyl, $R^1$-$R^{18}$ are each independently an atom or a group selected from the group consisting of hydrogen, halogen and hydrocarbon groups, $R^{15}$-$R^{18}$, linked together, may form a monocyclic or polycyclic group which may have a double bond, $R^{15}$ and $R^{16}$, or $R^{17}$ and $R^{18}$ may form an alkylidene group, p is 0 or 1, and $R^a$ and $R^b$ each independently represent a hydrogen atom or a hydrocarbon group when p is 1, and a 5-membered ring is formed as the result of forming a bond between the two corresponding carbon atoms when p is 0.

The thermoplastic resin composition of the invention is excellent in characteristics such as rigidity, dimension accuracy, impact resistance and light resistance. Accordingly, molded articles excellent in characteristics such as heat resistance, rigidity, impact resistance and light resistance can be prepared from the resin composition of the invention.

DETAILED DESCRIPTION OF THE INVENTION

The thermoplastic resin composition according to the present invention is concretely illustrated hereinafter.

The thermoplastic resin composition of the invention comprises a polymer comprising recurring units derived from a specific polycyclic (meth)acrylate and a soft polymer.

The polymer comprising recurring units derived from a specific polycyclic (meth)acrylate may be a (co)polymer of polycyclic (meth)acrylate(s), or a copolymer of a polycyclic (meth)acrylate and other copolymerizable monomers.

POLYCYCLIC (METH)ACRYLATE

Firstly, the polycyclic (meth)acrylate is illustrated.

The polycyclic (meth)acrylate can be represented by the formula [I]

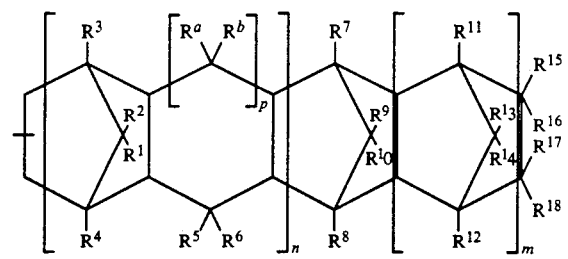

In the aforementioned formula [I], m is 0 or a positive integer, n is 0 or 1.

Moreover, R is hydrogen or methyl. That is, of compounds represented by the above-mentioned formula [I], those having a hydrogen atom as R are acrylate compounds, and those having a methyl group as R are methacrylate compounds. These acrylate compounds and methacrylate compounds can both be used in the present invention.

Furthermore, $R^1$-$R^{18}$ are each independently an atom or a group selected from the group consisting of hydrogen, halogen and hydrocarbon groups. The hydrocarbon groups usually have 1 to 15 carbon atoms, preferably 1 to 10 carbon atoms, and are linear branched. Concrete examples of the hydrocarbon group include aliphatic hydrocarbon groups such as methyl, ethyl, propyl, n-butyl, isobutyl, tert-butyl, pentyl, hexyl, heptyl, octyl, nonyl and decyl; alicyclic hydrocarbon groups such as cyclohexyl; and aromatic hydrocarbon groups such as phenyl, benzyl, tolyl, ethylphenyl, isopropylphenyl, α-naphthyl and anthracenyl. Examples of the halogen include fluorine, chlorine, bromine and iodine. $R^1$-$R^{18}$ are not required to be the same, and may, of course, be groups or atoms different from each other.

Still furthermore, $R^{15}$-$R^{18}$, linked together, may form a monocyclic or polycyclic group. For example, $R^{15}$ and $R^{17}$, linked together, may form as a whole, a cyclopentyl or cyclohexyl ring, or a ring structure in which a plural number of such rings are bonded together. The monocyclic or polycyclic group may have a double bond in the ring.

Moreover, $R^{15}$ and $R^{16}$, or $R^{17}$ and $R^{18}$ may form an alkylidene group such as ethylidene and propylidene.

Furthermore, p represents 0 or 1 in the formula [I]. $R^a$ and $R^b$ each independently represent a hydrogen atom or a hydrocarbon group when p is 1, and when p is 0, the corresponding two carbons are bonded together to form a 5-membered ring.

Concrete examples of the polycyclic (meth)acrylate represented by the aforementioned formula [I] include the compounds described below.

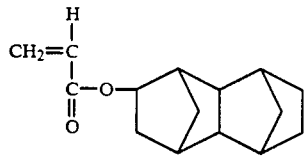

Tetracyclo[4.4.0.1$^{2,5}$.1$^{7,10}$]dodecyl-3-acrylate

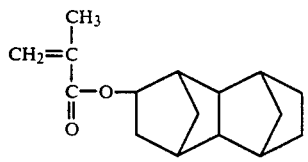

Tetracyclo[4.4.0.1$^{2,5}$.1$^{7,10}$]dodecyl-3-methacrylate

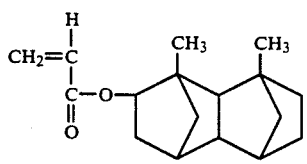

2,10-Dimethyltetracyclo[4.4.0.1$^{2,5}$.1$^{7,10}$]dodecyl-3-acrylate

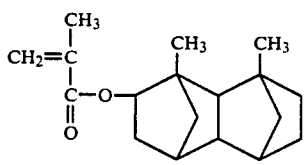

2,10-Dimethyltetracyclo[4.4.0.1$^{2,5}$.1$^{7,10}$]dodecyl-3-methacrylate

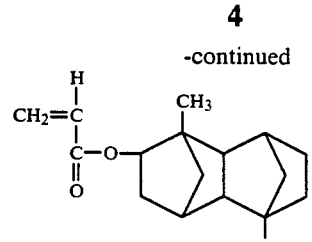

2-7-Dimethyltetracyclo[4.4.0.1$^{2,5}$.1$^{7,10}$]dodecyl-3-acrylate

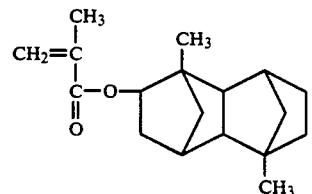

2,7-Dimethyltetracyclo[4.4.0.1$^{2,5}$.1$^{7,10}$]dodecyl-3-methacrylate

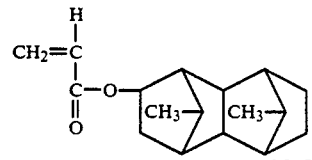

11,12-Dimethyltetracyclo[4.4.0.1$^{2,5}$.1$^{7,10}$]dodecyl-3-acrylate

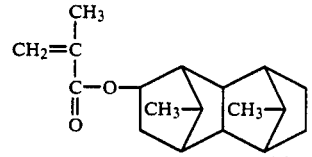

11,12-Dimethyltetracyclo[4.4.0.1$^{2,5}$.1$^{7,10}$]dodecyl-3-methacrylate

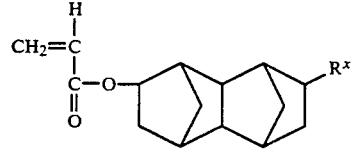

9-Substituted tetracyclo[4.4.0.1$^{2,5}$.1$^{7,10}$]dodecyl-3-acrylate

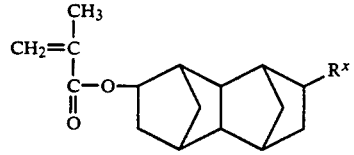

9-Substituted tetracyclo[4.4.0.1$^{2,5}$.1$^{7,10}$]dodecyl-3-methacrylate

In the above-mentioned two formulas, $R^x$ represents an aliphatic hydrocarbon group such as methyl, ethyl, propyl, isobutyl, hexyl and stearyl, an alicyclic hydrocarbon group such as cyclohexyl, or a halogen atom such as a bromine atom and a fluorine atom.

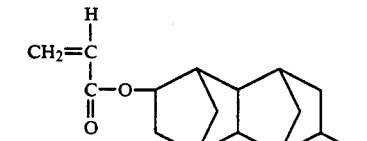

8-Substituted tetracyclo[4.4.0.1$^{2,5}$.1$^{7,10}$]dodecyl-3-acrylate

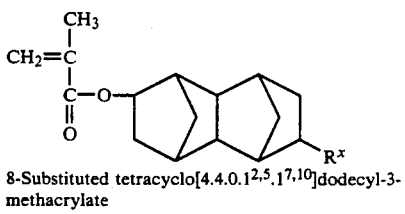

8-Substituted tetracyclo[4.4.0.1$^{2,5}$.1$^{7,10}$]dodecyl-3-methacrylate

In the above-mentioned two formulas, R$^x$ represents an aliphatic hydrocarbon group such as methyl, ethyl, propyl, isobutyl, hexyl and stearyl, an alicyclic hydrocarbon group such as cyclohexyl, or a halogen atom such as a bromine atom and a fluorine atom.

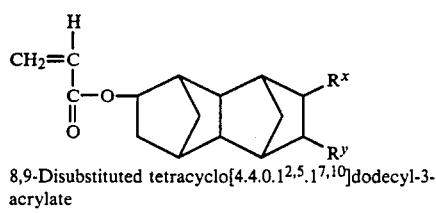

8,9-Disubstituted tetracyclo[4.4.0.1$^{2,5}$.1$^{7,10}$]dodecyl-3-acrylate

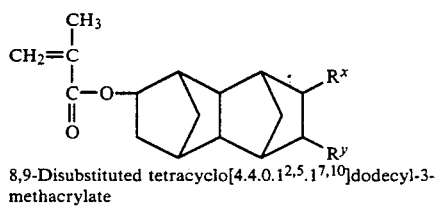

8,9-Disubstituted tetracyclo[4.4.0.1$^{2,5}$.1$^{7,10}$]dodecyl-3-methacrylate

In the above-mentioned two formulas, R$^x$ and R$^y$ each independently represent an aliphatic hydrocarbon group such as methyl, ethyl, propyl, isobutyl, hexyl and stearyl, an alicyclic hydrocarbon group such as cyclohexyl, or a halogen atom such as a bromine atom and a fluorine atom.

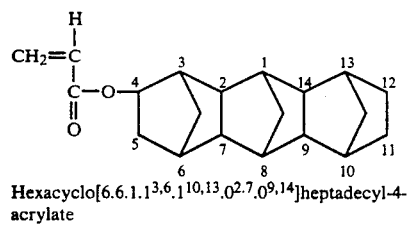

Hexacyclo[6.6.1.1$^{3,6}$.1$^{10,13}$.0$^{2,7}$.0$^{9,14}$]heptadecyl-4-acrylate

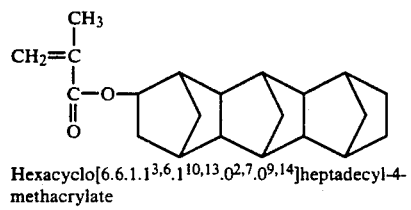

Hexacyclo[6.6.1.1$^{3,6}$.1$^{10,13}$.0$^{2,7}$.0$^{9,14}$]heptadecyl-4-methacrylate

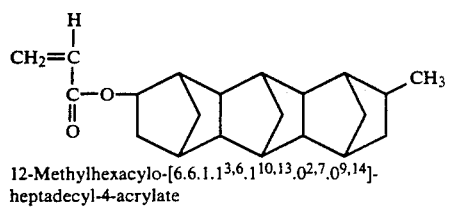

12-Methylhexacylo-[6.6.1.1$^{3,6}$.1$^{10,13}$.0$^{2,7}$.0$^{9,14}$]-heptadecyl-4-acrylate

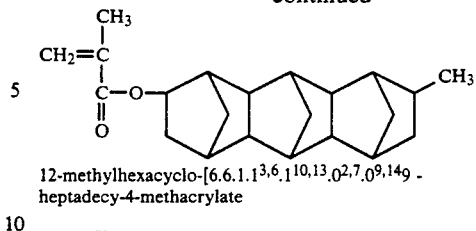

12-methylhexacyclo-[6.6.1.1$^{3,6}$.1$^{10,13}$.0$^{2,7}$.0$^{9,14}$]-heptadecy-4-methacrylate

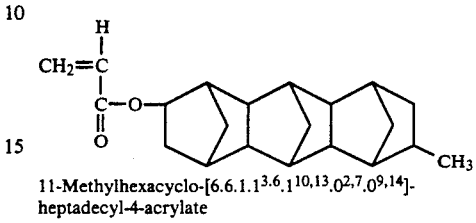

11-Methylhexacyclo-[6.6.1.1$^{3,6}$.1$^{10,13}$.0$^{2,7}$.0$^{9,14}$]-heptadecyl-4-acrylate

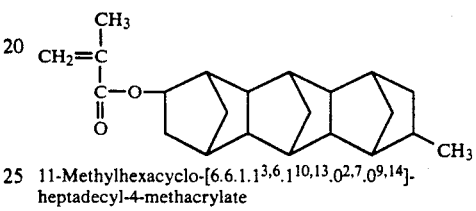

11-Methylhexacyclo-[6.6.1.1$^{3,6}$.1$^{10,13}$.0$^{2,7}$.0$^{9,14}$]-heptadecyl-4-methacrylate

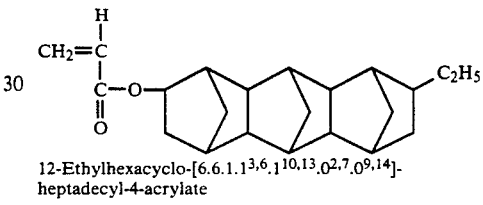

12-Ethylhexacyclo-[6.6.1.1$^{3,6}$.1$^{10,13}$.0$^{2,7}$.0$^{9,14}$]-heptadecyl-4-acrylate

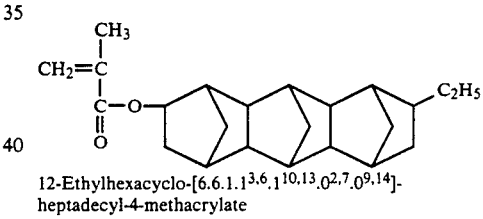

12-Ethylhexacyclo-[6.6.1.1$^{3,6}$.1$^{10,13}$.0$^{2,7}$.0$^{9,14}$]-heptadecyl-4-methacrylate

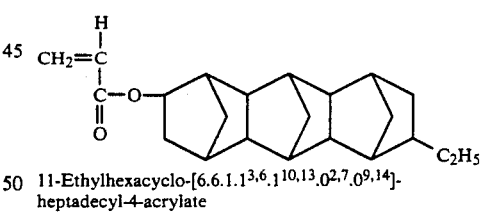

11-Ethylhexacyclo-[6.6.1.1$^{3,6}$.1$^{10,13}$.0$^{2,7}$.0$^{9,14}$]-heptadecyl-4-acrylate

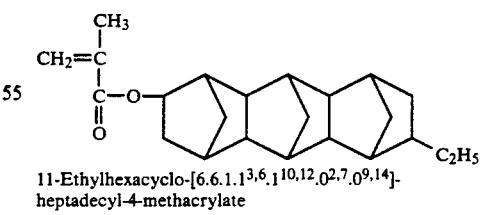

11-Ethylhexacyclo-[6.6.1.1$^{3,6}$.1$^{10,12}$.0$^{2,7}$.0$^{9,14}$]-heptadecyl-4-methacrylate

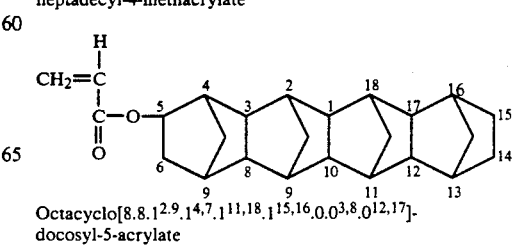

Octacyclo[8.8.1.2$^{9}$.1$^{4,7}$.1$^{11,18}$.1$^{15,16}$.0.0$^{3,8}$.0$^{12,17}$]-docosyl-5-acrylate

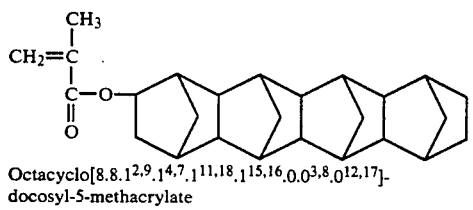

Octacyclo[8.8.1$^{2,9}$.1$^{4,7}$.1$^{11,18}$.1$^{15,16}$.0.0$^{3,8}$.0$^{12,17}$]-
docosyl-5-methacrylate

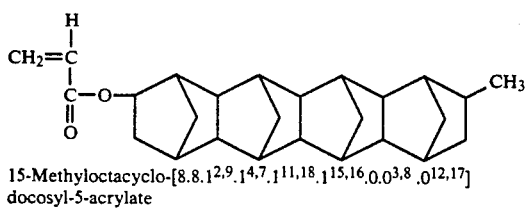

15-Methyloctacyclo-[8.8.1$^{2,9}$.1$^{4,7}$.1$^{11,18}$.1$^{15,16}$.0.0$^{3,8}$.0$^{12,17}$]
docosyl-5-acrylate

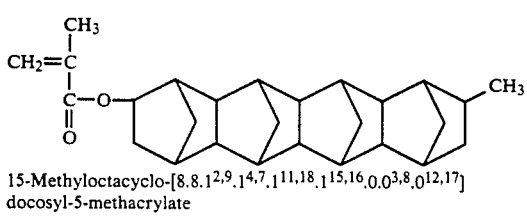

15-Methyloctacyclo-[8.8.1$^{2,9}$.1$^{4,7}$.1$^{11,18}$.1$^{15,16}$.0.0$^{3,8}$.0$^{12,17}$]
docosyl-5-methacrylate Examples of the polycyclic (meth)acrylate in which $R^{15}$–$R^{18}$ together form a single ring group represented by the aforementioned formula [I] include the compounds described below.

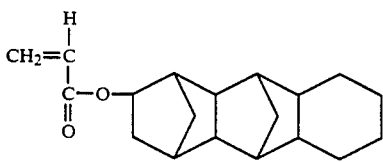

Pentacyclo[6.6.1.1$^{3,6}$.0$^{2,7}$.0$^{9,14}$]-
hexadecyl-4-acrylate

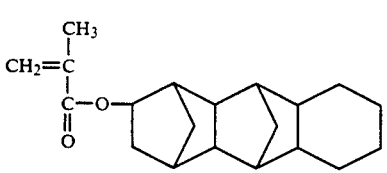

Pentacyclo[6.6.1.1$^{3,6}$.0$^{2,7}$.0$^{9,14}$]-
hexadecyl-4-methacrylate

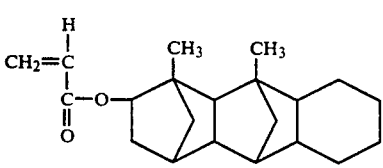

1,3-Dimethylpentacyclo-[6.6.1.1$^{3,6}$.0$^{2,7}$.0$^{9,14}$]
hexadecyl-4-acrylate

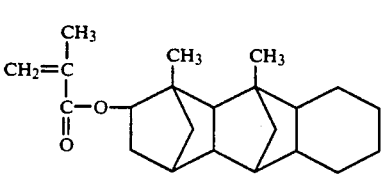

1,3-Dimethylpentacyclo-[6.6.1.1$^{3,6}$.0$^{2,7}$.0$^{9,14}$]
hexadecyl-4-methacrylate

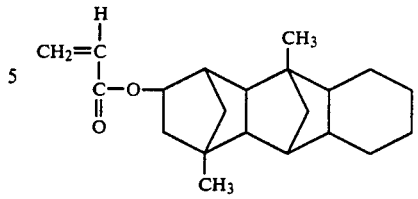

1,6-Dimethylpentacyclo-[6.6.1.1$^{3,6}$.0$^{2,7}$.0$^{9,14}$]
hexadecyl-4-acrylate

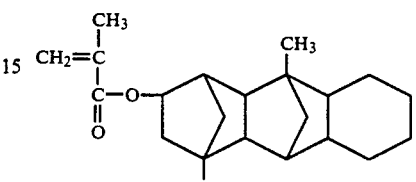

1,6-Dimethylpentacyclo-[6.6.1.1$^{3,6}$.0$^{2,7}$.0$^{9,14}$]
hexadecyl-4-methacrylate

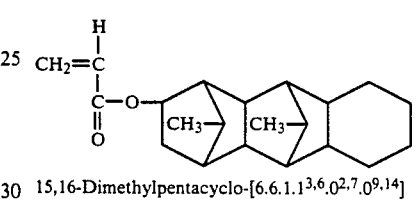

15,16-Dimethylpentacyclo-[6.6.1.1$^{3,6}$.0$^{2,7}$.0$^{9,14}$]
hexadecyl-4-acrylate

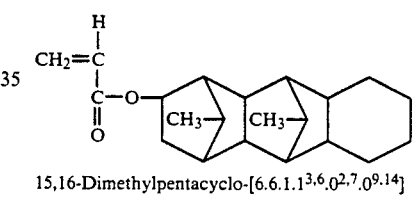

15,16-Dimethylpentacyclo-[6.6.1.1$^{3,6}$.0$^{2,7}$.0$^{9,14}$]
hexadecyl-4-methacrylate

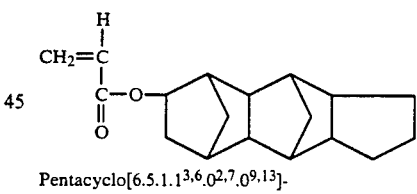

Pentacyclo[6.5.1.1$^{3,6}$.0$^{2,7}$.0$^{9,13}$]-
pentadecyl-4-acrylate

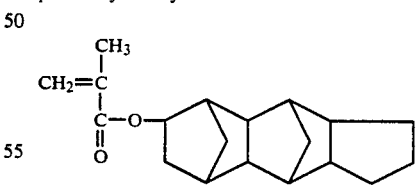

Pentacyclo[6.5.1.1$^{3,6}$.0$^{2,7}$.0$^{9,13}$]-
pentadecyl-4-methacrylate

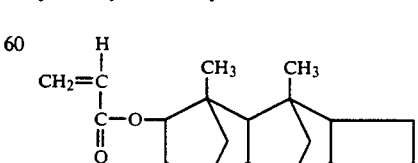

1,3-dimethylpentacyclo-[6.5.1.1$^{3,6}$.0$^{2,7}$.0$^{9,13}$]
pentadecyl4-acrylate

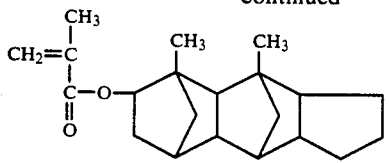

1,3-dimethylpentacyclo-[6.5.1.1$^{3,6}$.0$^{2,7}$.0$^{9,13}$]
pentadecyl-4-methacrylate

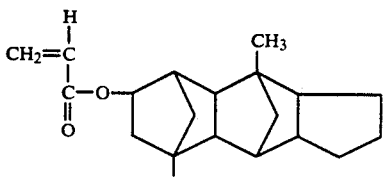

1,6-dimethylpentacyclo-[6.5.1.1$^{3,6}$.0$^{2,7}$.0$^{9,13}$]
pentadecyl-4-acrylate

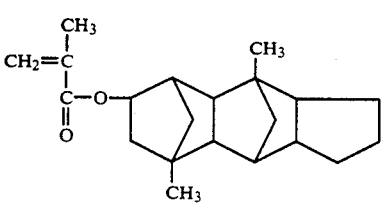

1,6-dimethylpentacyclo-[6.5.1.1$^{3,6}$.0$^{2,7}$.0$^{9,13}$]
pentadecyl-4-methacrylate

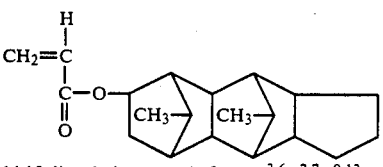

14,15-dimethylpentacyclo-[6.5.1.1$^{3,6}$.0$^{2,7}$.0$^{9,13}$]
pentadecyl-4-acrylate

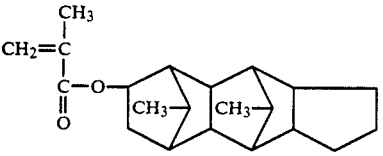

14,15-dimethylpentacyclo-[6.5.1.1$^{3,6}$.0$^{2,7}$.0$^{9,13}$]-
pentadecyl-4-methacrylate

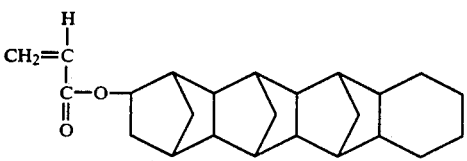

Heptacyclo[8.8.1$^{2,9}$.1$^{4,7}$.1$^{11,16}$.0.0$^{3,8}$.0$^{12,17}$]-
heneicosyl-5-acrylate

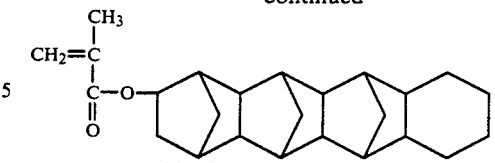

Heptacyclo[8.8.1$^{2,9}$.1$^{4,7}$.1$^{11,16}$.0.0$^{3,8}$.0$^{12,17}$]-
heneicosyl-5-methacrylate

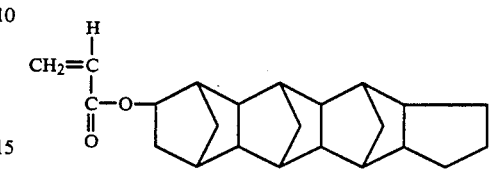

Heptacyclo[8.8.1$^{2,9}$.1$^{4,7}$.1$^{11,16}$.0.0$^{3,8}$.0$^{12,17}$]
eicosyl-5-acrylate

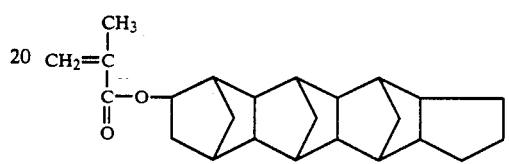

Heptacyclo[8.8.1$^{2,9}$.1$^{4,7}$.1$^{11,16}$.0.0$^{3,8}$.0$^{12,17}$]
eicosyl-5-methacrylate The polycyclic (meth)acrylates as mentioned above can be prepared, for example, by reacting a polycyclic alcohol, which has been prepared by reacting a cycloolefin having a structure corresponding to the polycyclic (meth)acrylate represented by the aforementioned formula [I] with formic acid, with a (meth)acrylic acid derivative including acrylic acid or methacrylic acid, or (meth)acrylyl halide such as an acrylyl halide or a methacrylyl halide.

The cycloolefin having a structure corresponding to that of the polycyclic (meth)acrylate used in this method can be represented by the following formula [II]

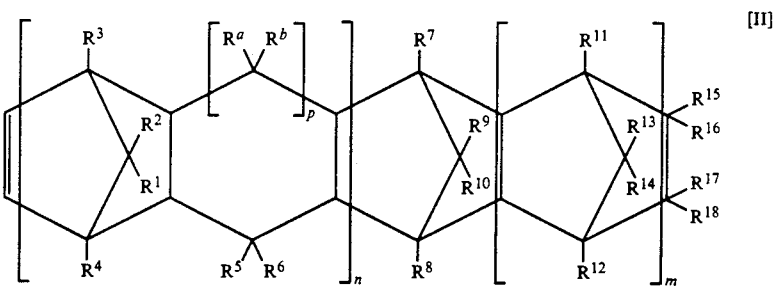

wherein $R^1$–$R^{18}$, $R^a$, $R^b$, and m, n and p are as defined in the aforementioned formula [I].

POLYCYCLIC (METH)ACRYLATE (CO)POLYMER

The polymer used in the thermoplastic resin composition of the invention comprising the recurring units derived from a polycyclic (meth)acrylate may be a homopolymer of the polycyclic (meth)acrylate as mentioned above. The polymer may also be a copolymer of the polycyclic (meth)acrylates, which are different from each other, as mentioned above. The polymer may also be a copolymer of the polycyclic (meth)acrylate as mentioned above and other copolymerizable monomers. In the present invention, the term "polycyclic (meth)acrylate (co)polymer" generally refers to these (co)polymers unless otherwise noted.

These other monomers to be copolymerized with the polycyclic (meth)acrylate include compounds having at least one polymerizable double bond in the molecule.

Concrete examples of such a compound include acrylic acids such as (meth)acrylate acid; acrylic acid derivatives such as methyl (meth)acrylate, ethyl (meth)acrylate, propyl (meth)acrylate, isopropyl (meth)acrylate, butyl (meth)acrylate, pentyl (meth)acrylate, hexyl (meth)acrylate, heptyl (meth)acrylate, octyl (meth)acrylate, nonyl (meth)acrylate, decyl (meth)acrylate, cyclohexyl (meth)acrylate and benzyl (meth)acrylate, aromatic vinyl compounds such as styrene, α-methylstyrene and vinyltoluene; acrylonitrile; maleic acid derivatives such as maleic anhydride, maleimide and phneylmaleimide; and vinyl esters such as vinyl acetate and vinyl benzoate.

The polycyclic (meth)acrylate (co)polymer is a (co)polymer prepared by polymerizing polycyclic (meth)acrylate(s) and if necessary other monomers as mentioned above.

When the polycyclic (meth)acrylate (co)polymer is a copolymer of a polycyclic (meth)acrylate and other monomers, the polycyclic (meth)acrylate (co)polymer comprises recurring units derived from the polycyclic (meth)acrylate in an amount of usually at least 5 mol%, preferably 10 to 99 mol% and especially 30 to 95 mol%. A resin composition excellent in heat resistance and heat stability can be obtained by using a copolymer comprising recurring units derived from a polycyclic (meth)acrylate in an amount in the range mentioned above.

The polycyclic (meth)acrylate (co)polymer has an intrinsic viscosity $[\eta]$, as measured in toluene at 30° C., of usually 0.002 to 20 dl/g, preferably 0.05 to 10 dl/g and especially 0.2 to 5 dl/g. The (co)polymer has a glass transition temperature, as measured by a differential scanning type calorimeter, of usually 10° to 200° C., preferably 50° to 200° C. and especially 105° to 200° C.

Furthermore, the polycyclic (meth)acrylate (co)polymer has a molecular weight distribution (Mw/Mn) of usually not greater than 10, preferably 1.0 to 3.0, as measured by gel permeation chromatography, a crystallinity of usually not greater than 5%, preferably not greater than 1%, as measured by X-ray diffraction, and a softening temperature of usually 20° to 220° C., preferably 70° to 220° C. and especially 120° to 220° C., as measured by a thermal mechanical analyzer (TMA) manufactured by DuPont).

When the polycyclic (meth)acrylate (co)polymer is a copolymer, the copolymer has a substantially linear molecular structure in which recurring units derived from the polycyclic (meth)acrylate and recurring units derived from other selected monomers are randomly arranged. The fact that the copolymer has a substantially linear molecular structure can be proved by observing dissolution thereof in an organic solvent without leaving any insoluble component. This can be proved, for example, by the fact that the polycyclic (meth)acrylate (co)polymer completely dissolves in toluene at 30° C. during the measurement of the intrinsic viscosity $[\eta]$ as described above.

The polycyclic (meth)acrylate (co)polymer can be prepared by various polymerization methods. For example, the polycyclic (meth)acrylate and other monomers can be copolymerized by polymerization methods such as suspension polymerization, emulsion polymerization, solution polymerization and bulk polymerization.

Examples of the bulk polymerization method include a method wherein the polymerization is carried out at a temperature of usually 60° to 250° C., preferably 150° to 230° C., and a method wherein the reaction temperature is elevated, for example, from 80° C., with the progress of the polymerization reaction, and the polymerization reaction is terminated, for example, at a temperature of 180° to 230° C. In these methods, radical initiators can be used. Examples of the radical initiators include organic peroxides such as di-tert-butylperoxide, dicumyl peroxide, methyl ethyl ketone peroxide, tert-butyl perphthalate, tert-butyl perbenzoate, di-tert-butyl peractetate and tert-butyl perisobutyrate, and azo compounds such as 1,1'-azobiscyclohexanecarbonitrile and 2-cyano-2-propylazoformamide. These radical initiators are used in an amount of usually not greater than 1 mol% based on the monomers.

During the (co)polymerization, there may also be used chain transfer agents such as tert-butylmercaptan, n-butylmercaptan, n-octylmercaptan and n-dodecylmercaptan in order to control the molecular weight of resultant polycyclic (meth)acrylate (co)polymer. The chain transfer agents are used in amount of usually not greater than 1 mol% based on the monomers.

Furthermore, the aforementioned (co)polymer may also be prepared by photopolymerization using energy ray irradiation with or without the use of the radical initiator as mentioned above.

The procedures of polymerization as described above are disclosed in detail, for example, in Japanese Patent L-O-P No. 243108/1988, etc., and can be utilized in the present invention.

SOFT POLYMER

The thermoplastic resin composition of the invention comprises the polycyclic (meth)acrylate (co)polymer mentioned above and a soft polymer (an elastomer).

Examples of the soft polymer include
(i) a soft polymer comprising recurring units derived from a cycloolefin,
(ii) an α-olefin polymer,
(iii) an α-olefin/diene copolymer, and a hydrogenated product thereof,
(iv) an aromatic vinyl hydrocarbon/conjugated diene soft copolymer, and a hydrogenated product thereof,
(v) soft polymer or copolymer selected from polyisobutylene, a polymer of a conjugated diene, or a copolymer of isobutylene and a conjugated diene, and
(vi) a polymer (so-called acrylic rubber) comprising recurring units derived from a (meth)acrylic acid ester.

Of these, the soft polymers (ii) and (vi) are preferably used. The soft polymers (i) and (ii) may be graft-modified polymers with α,β-unsaturated carboxylic acid or derivatives thereof.

Concrete examples of the soft polymer used in the invention are illustrated below.

SOFT POLYMER (i) COMPRISING RECURRING UNITS DERIVED FROM A CYCLOOLEFIN

The soft polymer comprising recurring units derived from a cycloolefin is a copolymer formed from ethylene, a cycloolefin represented by the formula [II] and α-olefin having 3 or more carbon atoms.

A graft-modulated soft polymer comprising recurring units derived from the cycloolefin may also be used as the soft polymer.

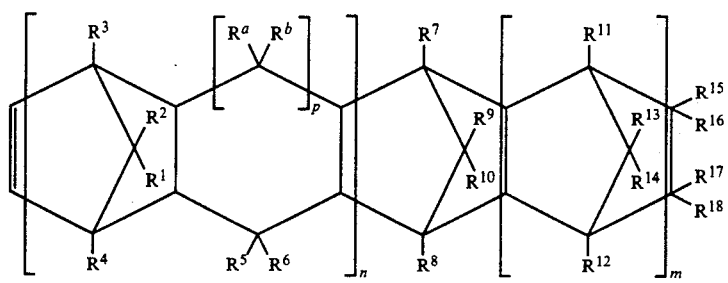

wherein $R^1$-$R^{18}$, $R^a$, $R^b$, and m, n and p are as defined in the aforementioned formula [I].

Examples of the cycloolefin include
bicyclo[2.2.1]hept-2-ene derivatives,
tetracyclo[4.4.0.1$^{2,5}$.1$^{7,10}$]-3-dodecene derivatives,
hexacyclo[6.6.1.1$^{3,6}$.1$^{1,13}$.0$^{2,7}$.0$^{9,14}$]-4-heptadecene derivatives,
octacyclo[8.8.0.1$^{2,9}$.1$^{4,7}$.1$^{11,18}$.1$^{13,16}$.0$^{3,8}$.0$^{12,17}$]-5-docosene derivatives,
pentacyclo[6.6.1.1$^{3,6}$.0$^{2,7}$.0$^{9,14}$]-4-hexadecene derivatives,
heptacyclo-5-eicosene derivatives,
heptacyclo-5-heneicosene derivatives,
tricyclo[4.3.0.1$^{2,5}$-]-3decene derivatives,
tricyclo[4.3.0.1$^{2,5}$-]-3undecene derivatives,
pentacyclo[6.1.1.1$^{3,6}$.0$^{2,7}$.0$^{9,13}$]-4-entadecene derivatives,
pentacyclopentadecadiene derivatives,
pentacyclo[4.7.0.1$^{2,5}$.0$^{8,13}$.1$^{9,12}$]-3-pentadecene derivatives,
pentacyclo[7.8.0.1$^{3,6}$.0$^{2,7}$.1$^{10,17}$.0$^{11,16}$.1$^{12,15}$]-4-eicosene derivatives,
nonacyclo[9.10.1.1.4.7.0$^{3,8}$.0$^{2,10}$.0$^{12,21}$.1$^{13,20}$.0$^{14,14}$.1$^{15,18}$]-5-pentacosene derivatives,
phenylbicyclo[2.2.1]-2-ene derivatives,
benzylbicyclo[2.2.1]-2-ene derivatives,
1,4-methano-1,1a,4,4a-tetrahydrofluorene derivatives,
1,4-methano-1,4,4a,5,10,10a-hexahydroanthracene derivatives,
cyclopentadiene-acenaphthylne adducts,
pentacyclo[7.4.0.1$^{2,5}$.0$^{8,13}$.1$^{9,12}$]pentadecene-3-derivatives,
heptacyclo[8.7.0.0$^{2,7}$.1$^{3,6}$.1$^{10,17}$.0$^{11,16}$.1$^{12,15}$]eicosene-4 derivatives and
nonacyclo[10.9.1.0$^{2,10}$.0$^{3,8}$.1$^{4,7}$.0$^{12,21}$.1$^{13,20}$.0$^{14,19}$.1$^{15,18}$-]pentacosene-5 derivatives.

Concrete examples of the compounds mentioned above are described below.

Bicyclo [2.2.1]hept-2-ene derivatives such as those mentioned below.

Bicyclo[2.2.1]
hept-2-ene

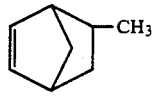
[II]

6-Methylbicyclo
[2.2.1]hept-2-ene

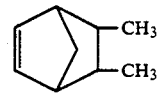
5,6-Dimethylbicyclo
[2.2.1]hept-2-ene

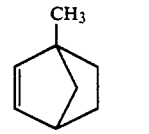
1-Metylbicyclo
[2.2.1]hept-2-ene

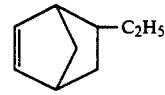
6-Ethylbicyclo
[2.2.1]hept-2-ene

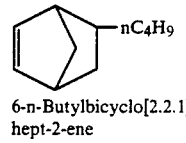
6-n-Butylbicyclo[2.2.1]
hept-2-ene

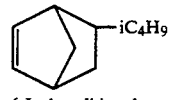
6-Isobutylbicyclo
[2.2.1]hept-2-ene

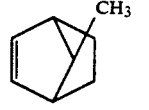
7-Methylbicyclo
[2.2.1]hept-2-ene

Tetracyclo[4.4.0.1$^{2,5}$.1$^{7,10}$]-3-dodecene derivatives such as those described below.

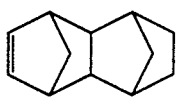
Tetracyclo[4.4.0.1$^{2,5}$.1$^{7,10}$]
-3-dodecene

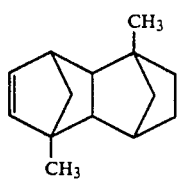

5,10-Dimethyltetracyclo-
[4.4.0.1$^{2,5}$.1$^{7,10}$]-3-dodecene

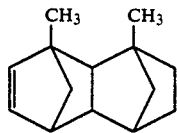

2,10-Dimethyltetracyclo-
[4.4.0.1$^{2,5}$.1$^{7,10}$]-3-dodecene

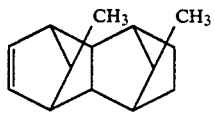

11,12-Dimethyltetracyclo-
[4.4.0.1$^{2,5}$.1$^{7,10}$]-3-dodecene

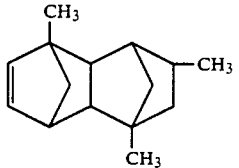

2,7,9-Trimethyltetracyclo-
[4.4.0.1$^{2,5}$.1$^{7,10}$]-3-dodecene

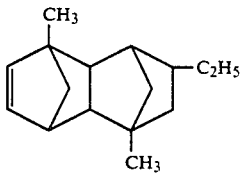

9-Ethyl-2,7-dimethyltetracyclo-
[4.4.0.1$^{2,5}$.1$^{7,10}$]-3-dodecene

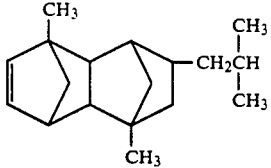

9-Isobutyl-2,7-dimethyltetracyclo-
[4.4.0.1$^{2,5}$.1$^{7,10}$]-3-dodecene

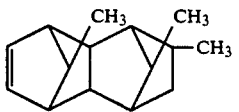

9,11,12-Trimethyltetracyclo-
[4.4.0.1$^{2,5}$.1$^{7,10}$]-3-dodecene

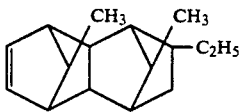

9-Ethyl-11,12-dimethyltetracyclo-
[4.4.0.1$^{2,5}$.1$^{7,10}$]-3-dodecene

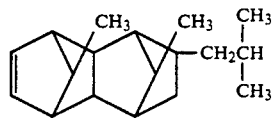

9-Isobutyl-11,12-dimethyltetracyclo-
[4.4.0.1$^{2,5}$.1$^{7,10}$]-3-dodecene

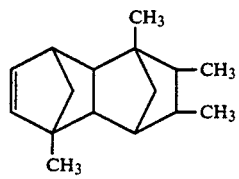

5,8,9,10-Tetramethyltetracyclo-
[4.4.0.1$^{2,5}$.1$^{7,10}$]-3-dodecene

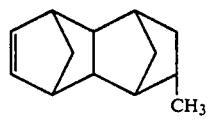

8-Methyltetracyclo
[4.4.0.1$^{2,5}$.1$^{7,10}$]-3-dodecene

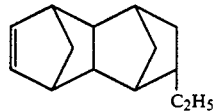

8-Ethyltetracyclo
[4.4.0.1$^{2,5}$.1$^{7,10}$]-3-dodecene

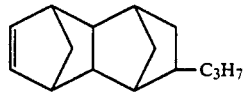

8-Propyltetracyclo
[4.4.0.1$^{2,5}$.1$^{7,10}$]-3-dodecene

8-Hexyltetracyclo
[4.4.0.1$^{2,5}$.1$^{7,10}$]-3-dodecene

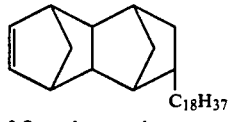

8-Stearyltetracyclo
[4.4.0.1$^{2,5}$.1$^{7,10}$]-3-dodecene

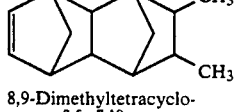

8,9-Dimethyltetracyclo-
[4.4.0.1$^{2,5}$.1$^{7,10}$]-3-dodecene

8-Methyl-9-ethyltetracyclo-
[4.4.0.1$^{2,5}$.1$^{7,10}$]-3-dodecene

-continued

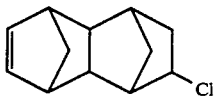
8-Chlorotetracyclo
[4.4.0.1$^{2,5}$.1$^{7,10}$]-3-dodecene

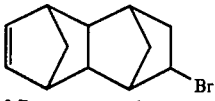
8-Bromotetracyclo
[4.4.0.1$^{2,5}$.1$^{7,10}$]-3-dodecene

8-Fluorotetracyclo
[4.4.0.1$^{2,5}$.1$^{7,10}$]-3-dodecene

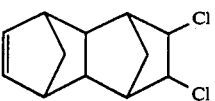
8,9-Dichlorotetracyclo-
[4.4.0.1$^{2,5}$.1$^{7,10}$]-3-dodecene

8-Cyclohexyltetracyclo-[4.4.0.1$^{2,5}$.1$^{7,10}$]
-3-dodecene

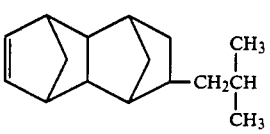
8-Isobutyltetracyclo-[4.4.0.1$^{2,5}$.1$^{7,10}$]
-3-dodecene

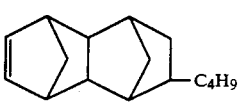
8-Butyltetracyclo[4.4.0.1$^{2,5}$.1$^{7,10}$]
-3-dodecene

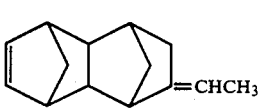
8-Ethylidenetetracyclo-
[4.4.0.1$^{2,5}$.1$^{7,10}$]-3-dodecene

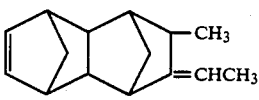
8-Ethylidene-9-methyltetracyclo-
[4.4.0.1$^{2,5}$.1$^{7,10}$]-3-dodecene

8-Ethylidene-9-ethyltetracyclo-
[4.4.0.1$^{2,5}$.1$^{7,10}$]-3-dodecene -continued

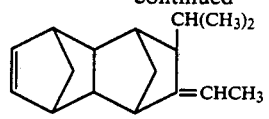
8-Ethylidene-9-isopropyltetracyclo-
[4.4.0.1$^{2,5}$.1$^{7,10}$]-3-dodecene

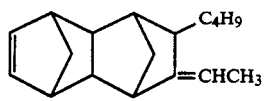
8-Ethylidene-9-butyltetracyclo-
[4.4.0.1$^{2,5}$.1$^{7,10}$]-3-dodecene

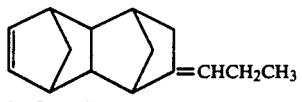
8-n-Propylidenetetracyclo-
[4.4.0.1$^{2,5}$.1$^{7,10}$]-3-dodecene

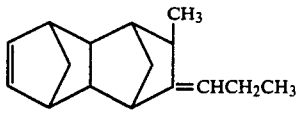
8-n-Propylidene-9-methyltetracyclo-
[4.4.0.1$^{2,5}$.1$^{7,10}$]-3-dodecene

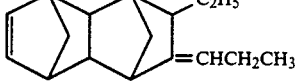
8-n-Propylidene-9-ethyltetracyclo-
[4.4.0.1$^{2,5}$.1$^{7,10}$]-3-dodecene

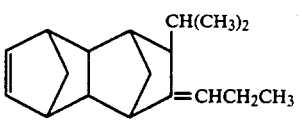
8-n-Propylidene-9-isopropyltetra-
cyclo[4.4.0.1$^{2,5}$.1$^{7,10}$]-3-dodecene

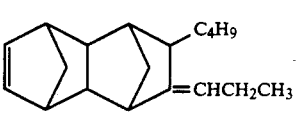
8-n-Propylidene-9-butyltetracyclo-
[4.4.0.1$^{2,5}$.1$^{7,10}$]-3-dodecene

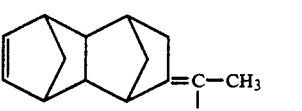
8-Isopropylidenetetracyclo-
[4.4.0.1$^{2,5}$.1$^{7,10}$]-3-dodecene

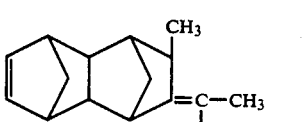
8-Isopropylidene-9-methyltetracyclo-
[4.4.0.1$^{2,5}$.1$^{7,10}$]-3-dodecene

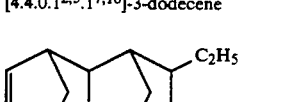
8-Isopropylidene-9-ethyltetracyclo-
[4.4.0.1$^{2,5}$.1$^{7,10}$]-3-dodecene

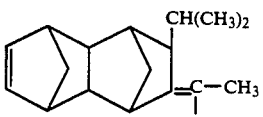

8-Isopropylidene-9-isopropyltetra-
cyclo[4.4.0.1$^{2,5}$.1$^{7,10}$]-3-dodecene

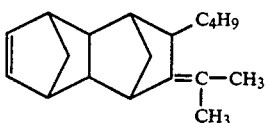

8-Isopropylidene-9-butyltetra-
cyclo[4.4.0.1$^{2,5}$.1$^{7,10}$]-3-dodecene

Hexacyclo[6.6.1.1$^{3,6}$.1$^{10,13}$.0$^{2,7}$.0$^{9,14}$]-4-heptadecene derivates such as those mentioned below.

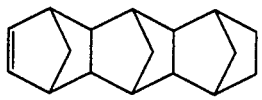

Hexacyclo[6.6.1.1$^{3,6}$.1$^{10,13}$.0$^{2,7}$.0$^{9,14}$]-
4-heptadecene

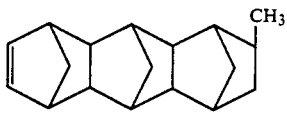

12-Metylhexacyclo[6.6.1.1$^{3,6}$.1$^{10,13}$.
0$^{2,7}$.0$^{9,14}$]-4-heptadecene

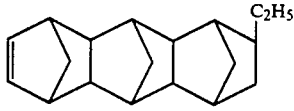

12-Ethylhexacyclo[6.6.1.1$^{3,6}$.1$^{10,13}$.
0$^{2,7}$.0$^{9,14}$]-4-heptadecene

12-Isobutylhexacyclo[6.6.1.1$^{3,6}$.1$^{10,13}$.0$^{2,7}$.0$^{9,14}$]
-4-heptadecene

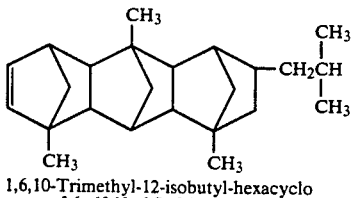

1,6,10-Trimethyl-12-isobutyl-hexacyclo
[6.6.1.1$^{3,6}$.1$^{10,13}$.0$^{2,7}$.0$^{9,14}$]-4-heptadecene Octacyclo[8.8.0.1$^{2,9}$.1$^{4,7}$.1$^{11,18}$.1$^{13,16}$.0$^{3,8}$.0$^{12,17}$]-5-docosene derivatives such as those mentioned below.

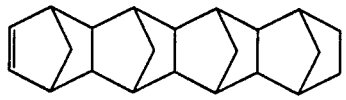

Octacyclo[8.8.0.1$^{2,9}$.1$^{4,7}$.1$^{11,18}$.1$^{13,16}$.0$^{3,8}$.0$^{12,17}$]-
5-docosene

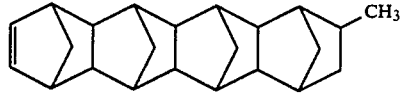

15-Methyloctacyclo[8.8.0.1$^{2,9}$.1$^{4,7}$.1$^{11,18}$.1$^{13,16}$.0$^{3,8}$.0$^{12,17}$]-
5-docosene

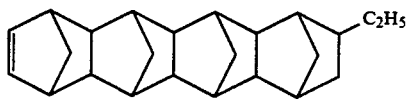

15-Ethyloctacyclo[8.8.0.1$^{2,9}$.1$^{4,7}$.1$^{11,18}$.1$^{13,16}$.0$^{3,8}$.0$^{12,17}$]-
5- docosene Pentacyclo[6.6.1.1$^{3,6}$.0$^{2,7}$.0$^{9,14}$]-4-hexadecene derivatives such as those mentioned below.

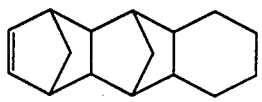

Pentacyclo[6.6.1.1$^{3,6}$.0$^{2,7}$.0$^{9,14}$]-
4-hexadecene

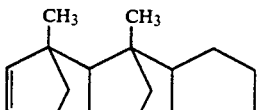

1,3 Dimethylpentacyclo[6.6.1.1$^{3,6}$.0$^{2,7}$.0$^{9,14}$]-
4-hexadecene

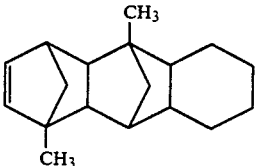

1,6-Dimethylpentacyclo[6.6.1.1$^{3,6}$.0$^{2,7}$.0$^{9,14}$]-
4-hexadecene

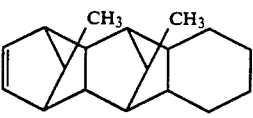

15,16-Dimethylpentacyclo[6.6.1.1$^{3,6}$.0$^{2,7}$.0$^{9,14}$]-
4-hexadecene

Heptacyclo-5-eicosene derivatives or heptacyclo-5-heneicosene derivatives such as those mentioned below.

Heptacyclo[8.7.0.1$^{2,9}$.1$^{4,7}$.1$^{11,17}$.0$^{3,8}$.0$^{12,16}$]-
5-eicosene

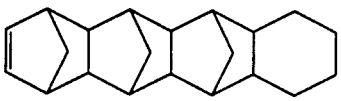

Heptacyclo[8.7.0.1$^{2,9}$.1$^{4,7}$.1$^{11,18}$.0$^{3,8}$.0$^{12,17}$]-
5-heneicosene Tricyclo[4.3.0.1$^{2,5}$]-3-decene derivatives such as those mentioned below.

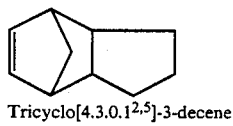

Tricyclo[4.3.0.1$^{2,5}$]-3-decene

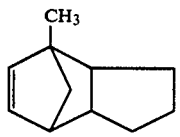

2-Methyltricyclo
[4.3.0.1$^{2,5}$]-3-decene

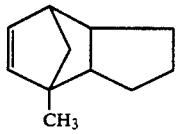

5-Methyltricyclo
[4.3.0.1$^{2,5}$]-3-decene

Tricyclo[4.4.0.1$^{2,5}$]-3-undecene derivatives such as those mentioned below.

Tricyclo[4.4.0.1$^{2,5}$]-3-undecene

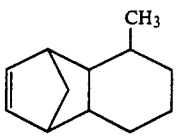

10-Methyltricyclo
[4.4.0.1$^{2,5}$]-3-undecene

Pentacyclo[6.5.1.1$^{3,6}$0.2$^{,7}$0.$^{9,13}$]-4-pentadecene derivatives such as those mentioned below.

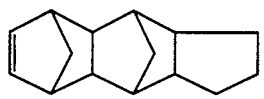

Pentacyclo[6.5.1.1$^{3,6}$.0$^{2,7}$.0$^{9,13}$]-
4-pentadecene

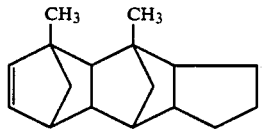

1,3-Dimethylpentacyclo
[6.5.1.1$^{3,6}$.0$^{2,7}$.0$^{9,13}$]-4-pentadecene

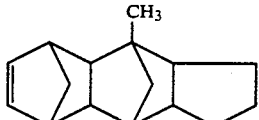

1,6-Dimethylpentacyclo
[6.5.1.1$^{3,6}$.0$^{2,7}$.0$^{9,13}$]-4-pentadecene

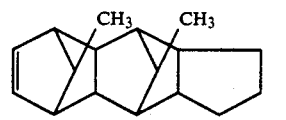

14,15-Dimethylpentacyclo
[6.5.1.1$^{3,6}$.0$^{2,7}$.0$^{9,13}$]-4-pentadecene

Diene compounds such as mentioned below.

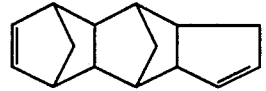

Pentacyclo[6.5.1.1$^{3,6}$.0$^{2,7}$.0$^{9,13}$]-
4.10-pentadecadiene

Pentacyclo[4.7.0.1$^{2,5}$.0$^{8,13}$.1$^{9,12}$]-3-pentadecene derivatives such as those mentioned below.

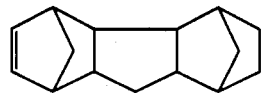

Pentacyclo[4.7.0.1$^{2,5}$.0$^{8,13}$.1$^{9,12}$]-
3-pentadecene

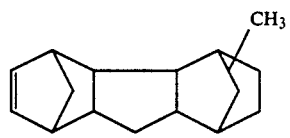

Methyl-substituted-pentacyclo
[4.7.0.1$^{2,5}$.0$^{8,13}$.1$^{9,12}$]-3-pentadecene Heptacyclo[7.8.0.1$^{3,6}$.0$^{2,7}$.1$^{10,17}$.0$^{11,16}$.1$^{12,15}$]-4-eicosene derivatives such as those mentioned below.

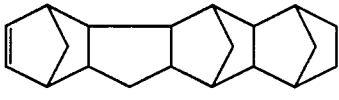

Heptacyclo[7.8.0.1$^{3,6}$.0$^{2,7}$.1$^{10,17}$.0$^{11,16}$.1$^{12,15}$]-
4-eicosene

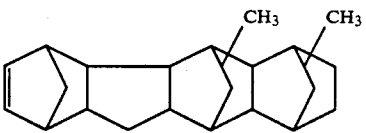

Dimethyl-substituted heptacyclo-
[7.8.0.1$^{3,6}$.0$^{2,7}$.1$^{10,17}$.0$^{11,16}$.1$^{12,15}$]-4-eicosene Nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene derivatives such as those mentioned below.

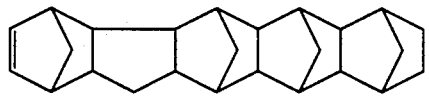

Nonacyclo[9.10.1.1$^{4,7}$.0$^{3,8}$.0$^{2,10}$.0$^{12,21}$.1$^{13,20}$.0$^{14,19}$.1$^{15,18}$]-
5-pentacosene

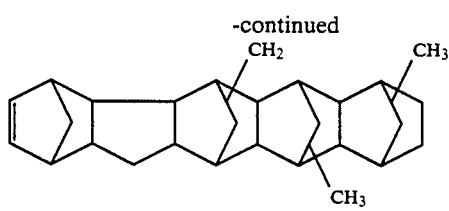

Trimethyl-substituted nonacyclo-[9.10.1.1$^{4,7}$.0$^{3,8}$.0$^{2,10}$.0$^{12,21}$.1$^{13,20}$.0$^{14,19}$.1$^{15,18}$]-5-pentacosene Furthermore, the cycloolefins used in the invention include the compounds described below.

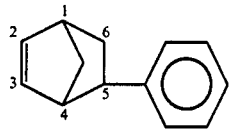

5-Phenylbicyclo[2.2.1]hept-2-ene

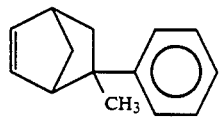

5-Methyl-5-phenylbicyclo[2.2.1]-hept-2-ene

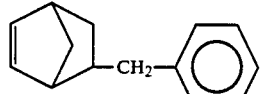

5-Benzylbicyclo[2.2.1]hept-2-ene

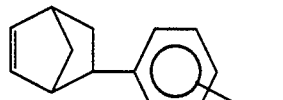

5-Tolylbicyclo[2.2.1]hept-2-ene

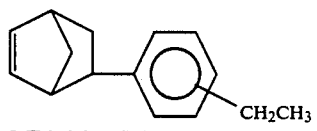

5-(Ethylphenyl)bicyclo-[2.2.1]hept-2-ene

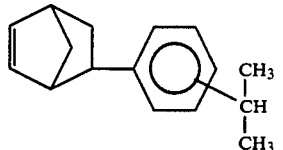

5-(Isopropylphenyl)bicyclo-[2.2.1]hept-2-ene

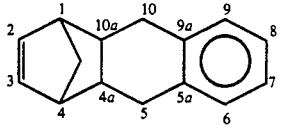

1,4-Methano-1,4,4a,5,10,10a-hexahydroanthracene

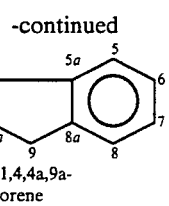

1,4-Methano-1,4,4a,9a-tetrahydrofluorene

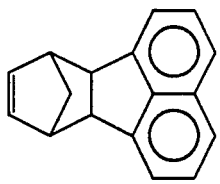

Cyclopentadiene-acenaphthylene adduct

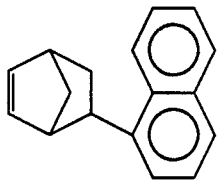

5-(α-Naphthyl)bicyclo-[2.2.1]hept-2-ene

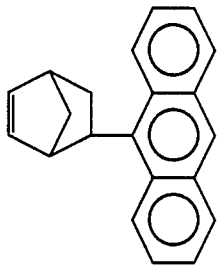

5-(Anthracenyl)bicyclo-[2.2.1]hept-2-ene

Furthermore, examples of the cycloolefins which can be used in the present invention include the compounds described below.

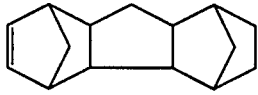

Pentacyclo[7.4.0.1$^{2,5}$.0$^{8,13}$.1$^{9,12}$]pentadecene-3

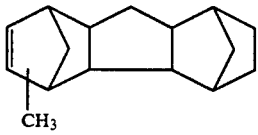

Methyl-pentacyclo[7.4.0.1$^{2,5}$.0$^{8,13}$.1$^{9,12}$]pentadecene-3

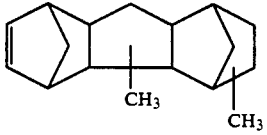

Dimethyl-pentacyclo[7.4.0.1$^{2,5}$.0$^{8,13}$.1$^{9,12}$]pentadecene-3

-continued

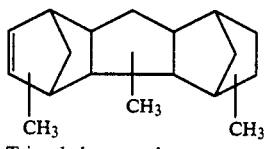
Trimethylpentacyclo
[7.4.0.1$^{2,5}$.0$^{8,13}$.1$^{9,12}$]pentadecene-3

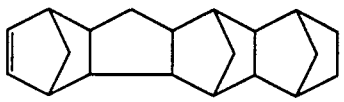
Heptacyclo[8.7.0.0$^{2,7}$.1$^{3,6}$.1$^{10,17}$.0$^{11,16}$.1$^{12,15}$]-eicosene-4

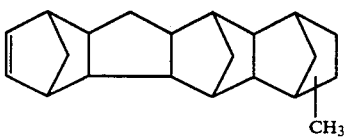
Methyl-heptacyclo
[8.7.0.0$^{2,7}$.1$^{3,6}$.1$^{10,17}$.0$^{11,16}$.]-eicosene-4

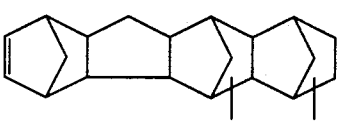
Dimethyl-heptacyclo
[8.7.0.0$^{2,7}$.1$^{3,6}$.1$^{10,17}$.0$^{11,16}$.1$^{12,15}$]-eicosene-4

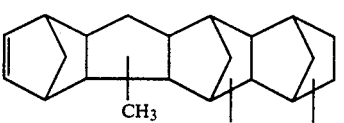
Trimethyl-heptacyclo
[8.7.0.0$^{2,7}$.1$^{3,6}$.1$^{10,17}$.0$^{11,16}$.1$^{12,15}$]-eicosene-4

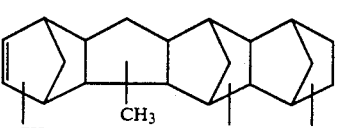
Tetramethyl-heptacyclo
[8.7.0.0$^{2,7}$.1$^{3,6}$.1$^{10,17}$.0$^{11,16}$.1$^{12,15}$]-eicosene-4

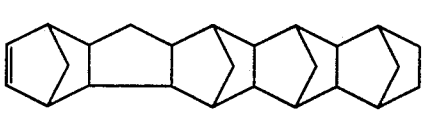
Nonacyclo[10.9.1.0$^{2,10}$.0$^{3,8}$.1$^{4,7}$.0$^{12,21}$.1$^{13,20}$.0$^{14,19}$.1$^{15,18}$]-pentacosene-5

Useful α-olefins having 3 or more carbon atoms include propylene, butene-1, 4-methylbutene-1, hexene-1, octene-1, decene-1, dodecene-1, tetradecene-1, hexadecene-1, octadecene-1 and eicosene-1. Of these, preferred is α-olefin having 3 to 20 carbon atoms. Cycloolefins and cyclodienes such as norbornene, ethylidenenorbornene and dicyclopentadiene may also be used.

The soft polymer (i) comprises recurring units derived from ethylene in an amount of usually 40 to 98 mol %, preferably 50 to 90 mol %, recurring units derived from α-olefin in an amount of usually 2 to 50 mol %, and recurring units derived from a cycloolefin in an amount of usually 2 to 20 mol %, preferably 2 to 15 mol %.

The soft polymer (i) has a glass transition temperature (Tg) of usually not higher than 0° C., preferably not higher than −10° C., an intrinsic viscosity [η], as measured in decalin at 135° C., of usually 0.01 to 10 dl/g, preferably 0.8 to 7 dl/g, and a crystallinity index, as measured by X-ray diffraction, of usually 0 to 20%, preferably 0 to 7% and especially 0 to 5%.

The soft polymer (i) as described above can be manufactured according to the method proposed by the present applicant in Japanese Patent L-O-P Nos. 168708/1985, 120816/1986, 115912/1986, 115916/1986, 271308/1986, 272216/1986 and 252406/1987.

α-OLEFIN COPOLYMER (ii)

The α-olefin copolymer (ii) used as a soft polymer is an amorphous or low crystalline copolymer prepared from at least two α-olefins. Concrete examples of the α-olefin copolymer (ii) include an ethylene/α-olefin copolymer and a propylene/α-olefin copolymer.

A graft-modified α-olefin copolymer (ii) may also be used as a soft polymer.

The α-olefin from which the ethylene/α-olefin copolymer is prepared has usually 3 to 20 carbon atoms. Concrete examples of the α-olefin include propylene, butene-1, 4-methylbutene-1, hexene-1, octene-1, decene-1 and a mixture of these α-olefins. Of these, preferred are α-olefins each having 3 to 10 carbon atoms.

The molar ratio of the recurring units derived from ethylene to those derived from α-olefin (ethylene/α-olefin) in the ethylene/α-olefin copolymer is usually 40/60 to 95/5, though it differs depending on the type of the α-olefin. The molar ratio is preferably 40/60 to 90/10 when propylene is used as the α-olefin, and is also preferably 50/50 to 95/5 when an α-olefin having at least 4 carbon atoms is used.

The α-olefin from which the propylene/α-olefin copolymer is prepared has usually 4 to 20 carbon atoms. Concrete examples of the α-olefin include butene-1, 4-methylpentene-1, hexene-1, octene-1, decene-1 and a mixture of these α-olefins. Of these, particularly preferred are α-olefins each having 4 to 10 carbon atoms.

The molar ratio of the recurring units derived from propylene to those derived from α-olefin (propylene/α-olefin) in the propylene/α-olefin copolymer is usually 50/50 to 95/5, though it differs depending on the type of the α-olefin.

α-OLEFIN/DIENE COPOLYMER AND A HYDROGENATED PRODUCT THEREOF (iii)

The α-olefin/diene copolymer (iii) used as a soft polymer includes an ethylene/α-olefin/diene copolymer rubber and a propylene/α-olefin/diene copolymer rubber.

An α-olefin having 3 to 20 carbon atoms is used for the ethylene/α-olefin/diene copolymer. Concrete examples of the α-olefin include propylene, butene-1, pentene-1, 4-methylpentene-1, hexene-1, octene-1, decene-1 and a mixture of these α-olefins. Of these, preferred are α-olefins each having 3 to 10 carbon atoms. An α-olefin each having 4 to 20 carbon atoms is used for a propylene/α-olefin/diene copolymer.

Furthermore, the dienes from which these copolymer rubbers are prepared include acyclic nonconjugated dienes such as 1,4-hexadiene, 1,6-octadiene, 2-methyl-1,5-hexadiene, 6-methyl-1,5-heptadiene and 7-methyl-1,6-octadiene, cyclic nonconjugated dienes such as 1,4- cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene, and 2,3-diisopropylidene-5-norbornene, 2-ethylidene-3-isopropylidene-5-norbornene and 2-propenyl-2,2-norbornadiene.

The molar ratio of the recurring units derived from ethylene to those derived from α-olefin (ethylene/α-olefin) in the ethylene/α-olefin/diene copolymer rubber is usually 40/60 to 90/10, though it differs depending on the type of the α-olefin.

The copolymer rubbers comprises recurring units derived from the diene component in an amount of usually 1 to 20 mol %, preferably 2 to 15 mol %.

Furthermore, a hydrogenated product of the aforementioned α-olefin/diene copolymer may also be used in the present invention.

AROMATIC VINYL HYDROCARBON/CONJUGATED DIENE SOFT COPOLYMER AND A HYDROGENATED PRODUCT THEREOF (iv)

The aromatic vinyl hydrocarbon/conjugated diene soft copolymer used as a soft polymer is a random copolymer or block copolymer of an aromatic vinyl hydrocarbon and a diene compound, or a hydrogenated product thereof. Concrete examples include a styrene/butadiene block copolymer rubber, a styrene/butadiene/styrene block copolymer rubber, a styrene/isoprene block copolymer rubber, a styrene/isoprene/styrene block copolymer rubber, a hydrogenated styrene/butadiene/styrene block copolymer rubber, a hydrogenated styrene/isoprene/styrene block copolymer rubber and a styrene/butadiene random copolymer rubber.

The molar ratio of the recurring units derived from the aromatic vinyl hydrocarbon to those derived from the conjugated diene (aromatic vinyl hydrocarbon/conjugated diene) in the copolymer rubbers is usually 10/90 to 70/30.

In the present invention, there can be used a hydrogenated product of the above-mentioned aromatic vinyl hydrocarbon/conjugated diene soft copolymer may also be used.

The hydrogenated copolymer rubber is a copolymer rubber wherein double bonds remaining in the above-mentioned copolymer rubbers have been partially or entirely hydrogenated.

SOFT POLYMER OR COPOLYMER OF ISOBUTYLENE, CONJUGATED DIENE OR ISOBUTYLENE/CONJUGATED DIENE (v)

Concrete examples of the isobutylene soft polymer or copolymer (v) used as a soft polymer include a polyisobutylene rubber, a polyisoprene rubber, a polybutadiene rubber or an isobutylene/isoprene copolymer rubber.

The copolymers (ii) to (v) may have similar characteristics to those of the cycloolefin soft polymer (i). These soft polymers have an intrinsic viscosity [η], as measured in decalin at 135° C., of usually 0.01 to 10 dl/g, preferably 0.08 to 7 dl/g, a glass transition temperature (Tg) of usually not higher than 0° C., preferably not higher than −10° C. and especially not higher than −20° C., and a crystallinity index, as measured by X-ray diffraction of 0 to 10%, preferably 0 to 7% and especially 0 to 5%.

In addition to the polymers as exemplified in (i) to (v), there may also be used as soft polymers copolymers (so-called block copolymers) obtained by graft polymerizing the soft polymers (i) to (v) with a polycyclic (meth)acrylate represented by the above-mentioned formula [I] or other monomers polymerizable with the polycyclic (meth)acrylate. A resin composition having excellent impact resistance can be obtained using such block copolymers.

POLYMER COMPRISING RECURRING UNITS DERIVED FROM A (METH)ACRYLIC ACID ESTER (vi)

Concrete examples of a (meth)acrylic acid ester polymer or copolymer (vi) used as a soft polymer include a homopolymer or copolymer of such an alkyl (meth)acrylate having 2 to 14 carbon atoms as ethyl acrylate, butyl acrylate, hexyl acrylate, octyl acrylate, decyl acrylate and octyl methacrylate, or a copolymer obtained by copolymerizing the above-mentioned monomers in a predominant amount with other monomers such as 2-chloroethyl vinyl ether, acrylonitrile, methoxyethyl acrylate, ethoxyethyl acrylate, vinyl chloroacetate, allyl chloroacetate, glycidyl acrylate or glycidyl methacrylate.

These soft polymers may be incorporated singly or in combination.

THERMOPLASTIC RESIN COMPOSITION

The thermoplastic resin composition of the invention comprises the polycyclic (meth)acrylic (co)polymer and the soft polymer as described above in the proportion by weight of the (co)polymer to the soft polymer of 99/1 to 40/60. The composition having the proportion in the range of 95/5 to 50/50, preferably 93/7 to 60/40, is particularly excellent in heat resistance, rigidity, dimension accuracy, impact resistance and light resistance.

The thermoplastic resin composition of the invention as described above has a melt flow rate (MFR, as measured according to ASTM D 1238) of usually 0.1 to 100.

The thermoplastic resin composition of the invention can be prepared by mixing the polycyclic (meth)acrylate (co)polymer and the soft polymer as described above in a predetermined proportion, and kneading the mixture using, for example, a melt kneading apparatus.

Furthermore, the thermoplastic resin composition of the invention may be the one having a crosslinked structure among the components of the composition. For example, a crosslinked structure can be formed between the polycyclic (meth)acrylate (co)polymer and the soft polymer as mentioned above by using an organic peroxide, etc. Moreover, in forming the crosslinked structure by using such organic peroxide, the crosslinking reaction may also be conducted by incorporating such a compound having at least two polymerizable functional groups in the molecule as divinylbenzene, vinyl acrylate and vinyl methacrylate.

OTHER ADDITIVES

The thermoplastic resin composition of the invention may be incorporated with heat stabilizers, weathering stabilizers, antistatic agents, slip agents, anti-blocking agents, anti-haze agents, lubricants, dyes, pigments, natural oil, synthetic oil, wax, organic or inorganic fillers, etc. so long as the incorporation does not impair the object of the invention.

Stabilizers to be used as optional components include for example, phenolic antioxidants such as tetrakis[methylene-3-(3,5-di-tert-butyl-4-hydroxyphenyl)propionate]methane, alkyl β-(3,5-di-tert-butyl-4-hydroxyphenyl)propionate and 2,2'-oxamidobis[ethyl-3-(3,5-di-tert-butyl-4-hydroxyphenyl)]propionate, aliphatic acid metal salts such as zinc stearate, calcium stearate and calcium 1,2-hydroxystearate, and aliphatic acid esters of polyhydric alcohols such as glycerin monostearate, glycerin distearate, pentaerythritol monostearate, pentaerythritol distearate and pentaerythritol tristearate. These stabilizers may be used singly or in combination. For example, tetrakis[methylene-3-(3,5-di-tert-butyl-4-hydroxyphenyl)propionate]methane, zinc stearate and glycerin monostearate may be used in combination.

Useful organic or inorganic fillers include silica, diatomaceous earth, alumina, titanium oxide, magnesium oxide, pumice powder, pumice balloons, aluminum hydroxide, magnesium hydroxide, basic magnesium carbonate, dolomite, calcium sulfate, potassium titanate, barium sulfate, calcium sulfite, talc, clay, mica, asbestos, glass fibers, glass flakes, glass beads, calcium silicate, montmorillonite, bentonite, graphite, aluminum powder, molybdenum sulfide, boron fibers, silicon carbide fibers, polyethylene fibers, polypropylene fibers, polyester fibers and polyamide fibers.

These other components can be mixed with the thermoplastic resin composition of the invention by any known method. For example, each of these other components can be simultaneously mixed with the thermoplastic resin composition.

Furthermore, the thermoplastic resin composition of the invention may be incorporated with other resins so long as the incorporation does not impair the object of the invention. Examples of these other resins include polyolefins, halogen-containing vinyl polymers, poly(meth)acrylate, polyacrylamide, polyacrylonitrile, acrylonitrile/butadiene/styrene copolymer, acrylonitrile styrene copolymer, acrylonitrile/styrene/acrylic acid ester copolymers, polyvinyl alcohol, polyvinyl acetate, polyvinyl stearate, polyvinyl benzoate, polyvinyl butyral, polyallyl phthalate, polyallylmelamine, ethylene/vinyl acetate copolymer, polyethylene oxide, polyacetal, polyphenylene oxide, polycarbonate, polysulfone, polyurethane, urea resins, polyamides, polyethylene terephthalate, polybutylene terephthalate, poly-1,4-dimethylolcyclohexane terephthalate, phenol/formaldehyde resin, urea/formaldehyde resin, melamine/formaldehyde resin, unsaturated polyester resins and natural polymers.

USE OF THERMOPLASTIC RESIN COMPOSITION

Molded articles in various forms can be prepared by using the thermoplastic resin composition of the invention, and utilizing conventional molding methods such as injection molding.

For example, molded articles in a film or sheet form can be manufactured by extrusion molding, and refrigerator interior boxes and trays can be manufactured by vacuum molding. Moreover, there can be manufactured containers for chemicals, drinks, etc., air ducts, sun visors, consoles, automobile interiors, various toys, floats, etc. by blow molding.

Concrete examples of molded articles which can be manufactured from the thermoplastic resin composition of the invention include (1) automobile parts:
  instrument panels, console boxes, meter clusters, column covers, grille door mirrors, bumpers, fenders, bonnets and radiators;

(2) machine housings:
  tools (e.g., electric tools), business machines (e.g., word processors, personal computers, copying machines, printers, FDD and CRT), precision instruments (e.g., cameras) and electrical appliances (e.g., electric ovens, electric rice cookers, pots and cleaners); and (3) others:
  toys, miscellaneous goods, furniture and sports goods.

EFFECT OF THE INVENTION

The thermoplastic resin composition of the present invention is excellent in characteristics such as rigidity, dimension accuracy, impact strength and light resistance. Accordingly, molded articles excellent in characteristics such as heat resistance, rigidity, impact strength and light resistance can be prepared from the resin composition of the invention.

EXAMPLES

The present invention is illustrated below with reference to examples, but it should be construed that the invention is in no way limited to these examples.

Methods for measuring and evaluating various physical properties in the invention are described below.

(1) Melt Flow Rate ($MFR_T$)

The melt flow rate is measured according to ASTM D 1238 at a predetermined temperature of T°C. under a load of 2.16 kg.

(2) Preparation of Test Pieces

Test pieces are molded under the following conditions using an injection molding machine (trade name of IS-55 EPN, manufactured by Toshiba Kikai K.K.) and a mold for the test pieces:

a cylinder temperature of 270° C. and a mold temperature of 90° C., primary/secondary injection pressures of 1000/800 kg/cm$^2$, and an injection speed (primary) of 30 mm/sec.

(3) Flexural Test

The flexural test is carried out according to ASTM D 790 under the following conditions:

the shape of the test piece: a size of 5×1/2×1/8' inches and a span of 51 mm, a test speed of 20 mm/min, and test temperatures of 23° C., 80° C. and 100° C.

(4) Heat Deflection Temperature (HDT)

The heat deflection temperature is measured according to ASTM D 628 under the following conditions:

a test piece size of 5×1/4×1/2' inches, and a load of 264 psi.

(5) Softening Temperature (TMA)

The softening temperature is measured by observing the heat deformation behavior of a sheet 1 mm thick using Thermo Mechanical Analyzer (trade name, manufactured by DuPont). That is, a quartz needle is placed on the sheet, and the sheet is heated at a rate of 5° C./min while a load of 49 g is applied to the needle. The TMA is a temperature at which the needle penetrates the sheet to the depth of 0.635 mm.

(6) Glass Transition Temperature (Tg) and Melting Point (Tm)

The glass transition temperature and the melting point are measured by using DSC 20 (trade name, manufactured by SEIKO Denshi Kogyo K.K.) and heating the test piece at a rate of 10° C./min.

(7) Rockwell Hardness

The Rockwell hardness is measured at 23° C. according to ASTM D 785.

(8) Izod Impact Test

The Izod impact test is carried out according to ASTM D 256 under the following conditions:
a test piece (notched) size of 5/2×1/8×1/2t inches, and
a test temperature of 23° c.

(9) Tensile Test

The tensile test is carried out according to ASTM D 638 under the following conditions:
a test piece shape: type IV,
a test speed of 50 mm/min, and
a test temperature of 23° C.

EXAMPLE 1

Preparation of a Polycyclic (Meth)Acrylic Polymer

In a nitrogen atmosphere were mixed 99 parts by weight of tetracyclo[4.4.0.1$^{2,5}$.1$^{7,10}$]dodecyl-3-acrylate (TDAC), 0.05 part by weight of n-octylmercaptan (OM) and 0.05 part by weight of 2,2'-azobisisobutyronitrile (AIBN), and polymerization was carried out at 80° C. for 24 hours. The resultant polymer (PTDAC) had an intrinsic viscosity [$\eta$] of 0.58 dl/g as measured in toluene at 30° C. and a TMA of 138° C.

Preparation of a Resin Composition of PTDAC and a Soft Polymer

Eighty-five parts by weight of the thus obtained PTDAC pellets and 15 parts by weight of an ethylene/propylene random copolymer (having an ethylene structural unit content of 80 mol %, a Tg of −54° C. and an intrinsic viscosity [$\eta$] of 2.2 dl/g) were sufficiently premixed. The mixture was melt blended by a twin screw extruder (trade name of PCM 45, manufactured by Ikegai Tekkosho K.K.) at a cylinder temperature of 230° C. to be pelletized. Test pieces were prepared from the pellets by the above-mentioned method, and physical properties thereof were evaluated.

The results are shown in Table 1.

EXAMPLE 2

Example 1 was repeated except that a soft polymer prepared by a procedure described below was used in place of the soft polymer of Example 1 to obtain a resin composition. Test pieces were prepared from the resin composition.

The results are shown in Table 1.

Preparation of a Soft Polymer

To 100 parts by weight of a xylene solution (solute concentration of 100 g/liter xylene) of an ethylene/propylene random copolymer (having an ethylene content of 80 mol % and an intrinsic viscosity [$\eta$] of 2.2 dl/g as measured in decalin at 135° C.) held at 80° C. in a nitrogen atmosphere was added dropwise a mixture of 30 parts by weight of TDAC, 1 part by weight of OM and 1 part by weight of AIBN over a period of 8 hours. The reaction was carried out for additional 16 hours to obtain a TDAC-grafted ethylene/propylene random copolymer.

EXAMPLE 3

Preparation of a Polycyclic (Meth)Acrylic Polymer

The procedure of Example 1 was repeated except that tetracyclo[4.4.0.1$^{2,5}$.1$^{7,10}$]dodecyl-3-methacrylate (TDMAC) was used in place of TDAC to obtain a polymer of TDMAC (PTDMAC).

Preparation of a Soft Polymer

To 100 parts by weight of an ethylene/propylene/ethylidenenorbornene random copolymer (having an ethylene content of 75 mol %, an ethylidenenorbornene content of 3 mol % and an intrinsic viscosity [$\eta$] of 2.4 dl/g as measured in decalin at 135° C.) were added 30 parts by weight of TDMAC, 1 part by weight of OM and 1 part by weight of AIBM to obtain a latex. The latex was heated to 80° c. in a nitrogen atmosphere. The reaction was carried out for additional 24 hours to obtain a TDMAC-grafted ethylene/propylene/ethylidenenorbornene random copolymer.

Preparation of a Resin Composition

A procedure similar to that in Example 1 was carried out by using PTDMAC and the soft polymer prepared above to obtain a resin composition.

Test pieces were prepared from the resin composition, and physical properties thereof were measured.

The results are shown in Table 1.

EXAMPLE 4

Preparation of a Polycyclic (Meth)Acrylate Polymer

The procedure of Example 1 was repeated except that a mixture of 66 parts by weight of TDAC and 33 parts by weight of styrene was used in place of 99 parts by weight of TDAC to obtain a copolymer of TDAC and styrene (PTDAC/St). The resultant polymer had an intrinsic viscosity [$\eta$] of 0.61 dl/g as measured in toluene at 30° C. and a TMA of 121° C.

Preparation of a Soft Polymer

The procedure of Example 2 was repeated except that a mixture of 20 parts by weight of TDAC and 10 parts by weight of styrene was used in place of 30 parts by weight of TDAC to obtain a TDAC/styrene-grafted ethylene/propylene random copolymer.

Preparation of a Resin Composition

The procedure of Example 1 was repeated by using PTDAC/St and the soft polymer prepared above to obtain a resin composition.

Test pieces were prepared from the resin composition, and physical properties thereof were measured.

The results are shown in Table 1.

EXAMPLES 5 AND 6

The procedure of Example 2 was repeated except that the proportion of PTDAC to the soft polymer was altered to obtain a resin composition.

Test pieces were prepared from the resin composition, and physical properties thereof were measured.

The results are shown in Table 1.

TABLE 1

| Example | * (wt. parts) | Flexural modulus (kg/cm²) | Flexural strength (kg/cm²) | Tensile strength (kg/cm²) | Tensile elongation (%) | Heat Deflect. Temp. (°C.) | Rockwell hardness (R-scale) | Izod impact strength (kg · cm/cm) |
|---|---|---|---|---|---|---|---|---|
| 1 | 85/15 | 22000 | 750 | 450 | 15 | 113 | 110 | 5 |
| 2 | 85/15 | 21500 | 760 | 460 | 15 | 115 | 110 | 18 |
| 3 | 85/15 | 21800 | 750 | 470 | 15 | 114 | 110 | 20 |
| 4 | 85/15 | 21000 | 740 | 460 | 13 | 97 | 105 | 20 |
| 5 | 90/10 | 26500 | 800 | 530 | 10 | 115 | 115 | 10 |
| 6 | 70/30 | 16000 | 600 | 400 | 25 | 103 | 98 | 45 |

*: Polycyclic (meth)acrylate/soft polymer

EXAMPLES 7 TO 10

The procedures of Examples 1 was repeated except that acrylic rubber was used as a soft polymer and the type and amount thereof were altered.

The results are shown in Table 2.

TABLE 2

| Example | Type of acrylic rubber | * (wt. parts) | Flexural modulus (kg/cm²) | Flexural strength (kg/cm²) | Tensile strength (kg/cm²) | Tensile elongation (%) | Heat Deflect. Temp. (°C.) | Rockwell hardness (R-scale) | Izod impact strength (kg · cm/cm) |
|---|---|---|---|---|---|---|---|---|---|
| 7 | NIPOL AR-51*¹ | 85/15 | 23500 | 770 | 470 | 15 | 116 | 110 | 15 |
| 8 | NIPOL AR-54*² | 85/15 | 22000 | 750 | 460 | 15 | 114 | 110 | 17 |
| 9 | NIPOL AR-54*² | 90/10 | 27000 | 820 | 550 | 10 | 115 | 115 | 10 |
| 10 | NIPOL AR-54*² | 70/30 | 16000 | 580 | 410 | 25 | 102 | 96 | 40 |

Note: *: Polycyclic (meth)acrylate/acrylic rubber
In Table 2, the acrylic rubbers, NIPOL AR-51*¹ and NIPOL AR-54*², are both acrylic rubbers manufactured by Nihon Zeon K.K. The acrylic rubbers, NIPOL AR-51*¹ and NIPOL AR-54*², are each a compolymer containing recurring units derived from a lower alkyl (meth)acrylate.

What is claimed is:

1. A moldable thermoplastic resin composition having high heatresistance, rigidity, dimension accuracy and impact resistance, said composition consisting essentially of:

(A) a polymer comprising recurring units derived from a polycyclic (meth)acrylate represented by the following formula (I)

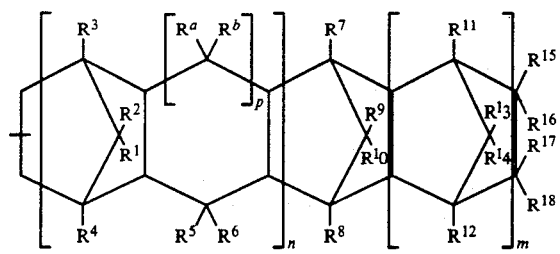

(I)

wherein m is 0 or a positive integer, n is 0 or 1, m+n≧1 R is hydrogen or methyl, $R^1$-$R^{18}$ are each independently selected from the group consisting of hydrogen atom, halogen atom and hydrocarbon groups, or $R^{15}$-$R^{18}$, linked together, form a monocyclic or polycyclic group which may have a double bond, or $R^{15}$ and $R^{16}$, or $R^{17}$ and $R^{18}$ form an alkylidene group, p is 0 or 1, and when p is 1, $R^a$ and $R^b$ each independently represent a hydrogen atom or a hydrocarbon group, and (B) at least one soft polymer having a glass transition temperature of not higher than 0° C., an intrinsic viscosity (η) as measured in decalin at 135° C., of 0.01 to 10 dl/g, and a crystallinity index as measured by x-ray diffraction of 0 to 10% wherein said at least one soft polymer is selected from the group consisting of:

(a) an aromatic vinyl hydrocarbon/conjugated diene soft polymer, a hydrogenated product thereof, a graft modified product thereof;

(b) a homopolymer of an alkyl (meth)acrylate having 2 to 14 carbon atoms; and (c) a copolymer of an alkyl (meth) acrylate having 2 to 14 carbon atoms, such that the proportion by weight of the (A) polymer to the (B) soft polymer of 93:7 to 60:40.

2. The thermoplastic resin composition according to claim 1, wherein said polymer (A) comprising recurring units derived from the polycyclic (meth)acrylate represented by the formula (I) is a copolymer which comprises the recurring units in an amount of at least 5 mol %.

3. The thermoplastic resin composition according to claim 1 wherein said polymer (A) comprising recurring units derived from the polycyclic (meth)acrylate represented by the formula (I) has an intrinsic viscosity (η), as measured in toluene at 30° C., of 0.002 to 20 dl/g.

4. The thermoplastic resin composition according to claim 1 wherein said polymer (A) comprising recurring units derived from the polycyclic (meth)acrylate represented by the formula (I) has a glass transition temperature, as measured by a differential scanning type calorimeter, of 10° to 200° C.

5. The thermoplastic resin composition according to claim 1 wherein said polymer (A) comprising recurring units derived from the polycyclic (meth)acrylate represented by the formula (I) has a molecular weight distribution (Mw/Mn), as measured by gel permeation chromatography, of not greater than 10.

6. The thermoplastic resin composition according to claim 1 wherein said polymer (A) comprising recurring units derived from the polycyclic (meth)acrylate represented by the formula (I) has a crystallinity, as measured by x-ray diffraction, of not greater than 5%.

7. The thermoplastic resin composition according to claim 1 wherein said polymer (A) comprising recurring units derived from the polycyclic (meth)acrylate represented by the formula (I) has a softening temperature, as measured by a thermal mechanical analyzer, of 20° to 220° C.

8. The thermoplastic resin composition according to claim 1 wherein said polymer (A) comprising recurring units derived from the polycyclic (meth)acrylate represented by the formula (I) is a copolymer having a substantially linear molecular structure in which recurring units derived from the polycyclic (meth)acrylate represented by the formula (I) and recurring units derived from other monomers are randomly arranged.

9. The thermoplastic resin composition of claim 1 wherein in formula (I) $m+n \geq$.

10. The thermoplastic resin composition of claim 1, further comprising one or more additives selected from heat stabilizers, weathering stabilizers, antistatic agents, slip agents, anti-blocking agents, anti-haze agents, lubricants, dyes, pigments, natural oils, synthetic oils, wax, organic fillers.

11. The thermoplastic resin composition of claim 1, further comprising a heat stabilizer selected from the group consisting of phenolic antioxidants, aliphatic acid metal salts, aliphatic acid esters, and combinations thereof.

12. The moldable thermoplastic resin composition of claim 3, wherein said composition has a heat deflection temperature of at least 97° C.

13. A molded shaped article obtained by molding the composition of claim 1.

* * * * *